(12) United States Patent
Mednikov et al.

(10) Patent No.: US 10,502,591 B2
(45) Date of Patent: Dec. 10, 2019

(54) SENSOR ARRANGEMENT AND METHOD FOR DETERMINING A POSITION AND/OR A CHANGE IN THE POSITION OF A MEASUREMENT OBJECT

(71) Applicant: MICRO-EPSILON Messtechnik GmbH & Co. KG, Ortenburg (DE)

(72) Inventors: Felix Mednikov, Ortenburg (DE); Johann Hofer, Ortenburg (DE); Christian Pfaffinger, Ruhstorf a. d. Rott (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 105 days.

(21) Appl. No.: 15/527,934

(22) PCT Filed: Nov. 20, 2015

(86) PCT No.: PCT/DE2015/200514
§ 371 (c)(1),
(2) Date: May 18, 2017

(87) PCT Pub. No.: WO2016/082830
PCT Pub. Date: Jun. 2, 2016

(65) Prior Publication Data
US 2018/0313666 A1     Nov. 1, 2018

(30) Foreign Application Priority Data

Nov. 24, 2014   (DE) .................... 10 2014 223 884

(51) Int. Cl.
  *G01D 5/20*      (2006.01)
(52) U.S. Cl.
  CPC ................... *G01D 5/2013* (2013.01)

(58) Field of Classification Search
  CPC ...... G01B 7/003; G01D 5/2013; G01D 5/147; G01D 5/2033
(Continued)

(56) References Cited

U.S. PATENT DOCUMENTS

| 5,150,049 A | * | 9/1992 | Schuetz | .............. F15B 15/2892 |
| | | | | 324/207.12 |
| 5,880,586 A | * | 3/1999 | Dukart | .................. G01D 5/145 |
| | | | | 324/207.2 |

(Continued)

FOREIGN PATENT DOCUMENTS

| DE | 3510601 A1 | 9/1986 |
| DE | 4021105 A1 | 2/1991 |

(Continued)

OTHER PUBLICATIONS

International Searching Authority (ISA), International Search Report (ISR) and Written Opinion for International Application No. PCT/DE2015/200514, dated Mar. 30, 2016, 12 pages, European Patent Office, Netherlands.

(Continued)

*Primary Examiner* — Patrick Assouad
*Assistant Examiner* — Demetrius R Pretlow
(74) *Attorney, Agent, or Firm* — Alston & Bird LLP (57) ABSTRACT

A sensor arrangement for determining a position and/or a change in the position of a measurement object is described, wherein the sensor arrangement has a magnet and a magnetic field sensor which can be moved relative to one another in a direction of movement. The magnet generates a magnetic field. Movements of the magnet and of the measurement object or movements of the magnetic field sensor and of the measurement object are coupled. To achieve the greatest possible measurement range with a characteristic curve which is as linear as possible at the same time, the (Continued)

sensor arrangement comprises a rod-shaped body which is made from a ferromagnetic material and has a considerably larger dimension in the longitudinal direction than in the transverse direction. A relative movement takes place between the rod-shaped body and the magnet, wherein the rod-shaped body can be connected to the magnet. The magnetic field from the magnet is at least partially directed in the direction of the magnetic field sensor. In this case, the rod-shaped body is arranged parallel to the direction of movement. The magnetic field sensor is arranged on a longitudinal side of the rod-shaped body and is configured to generate a measurement signal from a portion of the magnetic field which emerges from the rod-shaped body at the magnetic field sensor. As a result, the position and/or change in the position of the measurement object can be determined from the measurement signal.

19 Claims, 9 Drawing Sheets (58) Field of Classification Search
USPC .......................................... 324/207.11, 207.13
See application file for complete search history.

(56) References Cited

U.S. PATENT DOCUMENTS

| | | | | |
|---|---|---|---|---|
| 6,426,620 | B1* | 7/2002 | Taguchi | G01R 33/09 |
| | | | | 257/427 |
| 7,081,059 | B2* | 7/2006 | Iwamoto | F01L 1/024 |
| | | | | 137/554 |
| 8,575,921 | B1* | 11/2013 | Sloan | G01B 7/003 |
| | | | | 242/563 |
| 9,644,994 | B2* | 5/2017 | Noguchi | G01R 33/09 |
| 2005/0184725 | A1* | 8/2005 | Wang | G01D 5/145 |
| | | | | 324/207.2 |
| 2005/0231193 | A1* | 10/2005 | Yamamoto | G01D 5/145 |
| | | | | 324/207.2 |
| 2006/0164074 | A1 | 7/2006 | Andrieu et al. | |
| 2007/0200558 | A1* | 8/2007 | Sellen | G01D 5/202 |
| | | | | 324/176 |
| 2007/0216401 | A1 | 9/2007 | Baak et al. | |
| 2007/0229058 | A1* | 10/2007 | Wolf | G01D 5/145 |
| | | | | 324/207.24 |
| 2009/0001971 | A1 | 1/2009 | Racz et al. | |
| 2010/0090688 | A1* | 4/2010 | Mednikov | G01D 5/2033 |
| | | | | 324/207.15 |
| 2013/0056661 | A1* | 3/2013 | Tang | F01L 9/04 |
| | | | | 251/129.15 |
| 2013/0086900 | A1* | 4/2013 | Kim | B60T 11/16 |
| | | | | 60/533 |

FOREIGN PATENT DOCUMENTS

| | | |
|---|---|---|
| DE | 20310026 U1 | 11/2003 |
| DE | 20307652 U1 | 10/2004 |
| EP | 1132717 A1 | 9/2001 |
| EP | 1826533 A1 | 8/2007 |
| EP | 2009404 A2 | 12/2008 |
| WO | WO 2008/074317 A2 | 6/2008 |

OTHER PUBLICATIONS

The International Bureau of WIPO, International Preliminary Report on Patentability (English translation of ISA's Written Opinion) for International Application No. PCT/DE2015/200514, dated May 30, 2017, 6 pages, Switzerland.

* cited by examiner

SENSOR ARRANGEMENT AND METHOD FOR DETERMINING A POSITION AND/OR A CHANGE IN THE POSITION OF A MEASUREMENT OBJECT

CROSS REFERENCE TO RELATED APPLICATIONS

This application is a national stage application, filed under 35 U.S.C. § 371, of International Application No. PCT/DE2015/200514, filed Nov. 20, 2015, which claims priority to German Application No. 10 2014 223 884.6, filed Nov. 24, 2014, the contents of both of which as are hereby incorporated by reference in their entirety.

BACKGROUND

Technical Field

The invention relates to a sensor arrangement for determining the position and/or the change in the position of an object to be measured.

Description of Related Art

Sensor arrangements and methods for determining the position and/or the change in the position are widely used in the field, where the position of a measured object relative to a reference point is measured. For a contactless measurement, capacitive or inductive measurement methods are used quite often. A type of sensor that is known from the field uses a magnet and a magnetic field sensor. One embodiment of such a sensor is known, for example, from the German patent DE 40 21 105 A1, where the rotational movement of an encoder wheel, encoded with north and south poles, is determined relative to a sensor arrangement. By skillfully arranging the sensors relative to the encoder wheel it is possible to deduce the position of the encoder wheel from the measurement signals of the sensors.

In another embodiment a measurement signal is generated by the magnetic field sensor, and this measurement signal depends on the portion of the magnet's magnetic field that is still present at the magnetic field sensor. Since the magnetic field of a magnet decreases as the distance from the magnet increases, the distance between the magnet and the magnetic field sensor can be determined from the measurement signal. Such a sensor arrangement is disclosed, for example, in the world patent WO 2008/074317 A2. By restricting the relative movement between the magnet and the magnetic field sensor, for example, along a straight line or along a circular arc, the position of the magnet relative to the magnetic field sensor can be determined from the distance. In many cases the magnetic field sensor is arranged so as to be fixed in position, for example, on a machine frame, while the magnet is mounted on the actual object to be measured, for example, a movable part of the machine. Since the movements of the magnet and of the object to be measured are coupled by mounting the magnet on the object to be measured, the position of the object to be measured can be determined from the position of the magnet relative to the magnetic field sensor.

Another sensor arrangement is disclosed in the European patent EP 1 132 717 A1, where two ring-shaped permanent magnets are mounted on an axis, which can be moved relative to a magnetic field sensor. The magnetic field sensor comprises magnetoresistive elements that can detect the direction of a magnetic field. By analyzing the magnetoresistive elements it is possible to determine the position of the axis relative to the sensor.

A sensor unit that is provided for detecting the position of a piston and that also uses a magnet and a magnetic field sensor is known, for example, from the German patent DE 35 10 601 A1. A piston rod bears a working piston, in which a disk-shaped body, made of a magnetizable material, is disposed. The disk-shaped body extends radially from the piston rod up to the inner wall of the cylinder. Mounted on the piston rod near the disk-shaped body is a ring-shaped permanent magnet having a north-south direction that is aligned parallel to the axis of the piston rod. As a result, the disk-shaped body bundles the magnetic field of the magnet and directs it to the cylinder wall. A magnetic field sensor is mounted on the outside of the cylinder; and this magnetic field sensor detects the magnetic field that is generated by the magnet and is directed by the disk-shaped body to the cylinder wall. The position of the working piston can be determined from the measurement signal of the magnetic field sensor. The drawback with this sensor is that the detectable piston stroke is relatively limited. Furthermore, the sensor arrangement exhibits a behavior that is considerably non-linear. Furthermore, the range of application of the sensor arrangement is limited by the need for a disk that is disposed in the piston.

BRIEF SUMMARY

Therefore, the object of the present invention is to design and further develop a sensor arrangement and a method of the type, mentioned in the introductory part, in such a way that the objective of achieving the largest possible measurement range with a sensor arrangement that simultaneously exhibits a behavior that is as linear as possible can be achieved.

The present invention achieves this engineering object by means of the features disclosed in claim 1. According thereto, the sensor arrangement under discussion comprises a rod-shaped body, which is made of a ferromagnetic material and which has a significantly larger dimension in the longitudinal direction than in the transverse direction, wherein a relative movement between the rod-shaped body and the magnet does not take place, wherein namely the rod-shaped body can be connected to the magnet, wherein the magnetic field of the magnet directs at least partially in the direction of the magnetic field sensor, wherein the rod-shaped body is arranged parallel to the direction of movement x, and wherein the magnetic field sensor is disposed on a longitudinal side of the rod-shaped body and is configured to generate a measurement signal from a portion of the magnetic field that emerges from the rod-shaped body at the magnetic field sensor; as a result of which the position and/or the change in the position of the object to be measured can be determined from the measurement signal.

With respect to a method, the above engineering object is achieved by means of the features disclosed in claim 19. According thereto, the method comprises the following steps:

impressing a magnetic field in a rod-shaped body, made of a ferromagnetic material, by means of a magnet, wherein the magnetic field is directed at least partially in the direction of a magnetic field sensor by means of the rod-shaped body; and wherein the rod-shaped body is arranged parallel to a direction of movement x, in which the magnetic field sensor and/or the magnet can be moved relative to each other;

detecting a magnetic field, emerging on a longitudinal side of the rod-shaped body, by means of the magnetic field sensor for generating a measurement signal; and determining the position and/or the change in the position of the measured object from the measurement signal;

wherein the body has a significantly larger dimension in the longitudinal direction than in the transverse direction, and wherein a relative movement between the body and the magnet does not take place; wherein namely the rod-shaped body can be connected to the magnet.

First of all, it has been found in an inventive way that in a sensor arrangement that comprises a magnet and a magnetic field sensor, it is possible to use a rod-shaped body, made of a ferromagnetic material, in order to increase the measurement range, where in this case the body has a significantly larger dimension in the longitudinal direction than in transverse direction; and wherein a relative movement between the rod-shaped body and the magnet does not take place, wherein namely the rod-shaped body can be connected to the magnet. According to the invention, it has been found, in particular, that a rod-shaped body, which is made of a ferromagnetic material, does not completely guide the magnetic field of a magnet from end face to end face. Instead, a part of the magnetic field leaves the rod-shaped body at its longitudinal sides, as a result of which a magnetic field having a field strength that decreases as the distance from the magnet increases can be detected at the surface of the rod-shaped body. When the magnetic field, emerging from the rod-shaped body, is appropriately detected with a magnetic field sensor, it is possible to form a measure of the distance between the magnetic field sensor and the magnet, so that the measurement range of the sensor arrangement can be significantly increased in the case of the rod-shaped body. This feature can be used to determine the position of a measured object, the movement of which is a function of the movement of the magnet or the movement of the magnetic field sensor.

Therefore, according to the invention, a rod-shaped body, made of a ferromagnetic material, is arranged in the magnet's zone of influence and parallel to a direction of movement x, along which the magnet and/or the magnetic field sensor can be moved relative to each other. In this context "in the magnet's zone of influence" means that the magnet is able to couple a significant portion of its magnetic field into the rod-shaped body. This feature normally requires that the magnet be arranged relatively near the rod-shaped body. In this case distances of a few centimeters or less are conceivable. Then a decoupling would work especially well, if the distance were a few millimeters or less, up to contact between the rod-shaped body and the magnet. Arranging the rod-shaped body in the magnet's zone of influence allows the magnetic field of the magnet to be directed at least partially through the rod-shaped body in its longitudinal direction.

In order to detect a portion of the magnet's magnetic field, which emerges on one of the longitudinal sides of the rod-shaped body, a magnetic field sensor is arranged on a longitudinal side of the rod-shaped body. The magnetic field sensor generates, as a function of the detected portion of the magnetic field, a measurement signal, which is representative of the position of the object to be measured. In this way the position of the object to be measured can be determined. The change in the position can be determined from the change of the object to be measured.

In this case the portion of the magnet's magnetic field, leaving the rod-shaped body, has a non-linear, monotonically decreasing magnetic field strength along the rod-shaped body. The field strength at the surface of one longitudinal side of the rod-shaped body is the highest in the vicinity of the magnet and decreases in the direction of the end of the rod-shaped body. The magnetic field, emerging at the surface of the rod-shaped body, can be measured with a conventional magnetic field sensor, such as, for example, a Hall sensor or sensors based on the GMR (giant magnetoresistive) or AMR (anisotropic magnetoresistive) effect.

Advantageous is the use of special magnetic field sensors that have a non-linear characteristic curve. By combining these two effects, an approximately linear characteristic curve between the measurement signal and the distance between the magnet and the magnetic field sensor can be obtained. In this manner not only a large, continuous measurement range, but also an approximately linear characteristic curve can be obtained.

The term "rod-shaped body" is defined relatively loosely. In this context the essential aspect is that the body has a significantly larger dimension in the longitudinal direction than in the transverse direction. For example, ratios between the transverse dimension and the longitudinal dimension of 1:10 or more are conceivable. In order to avoid undesired scatterings at the surface of the rod-shaped body, its cross section, preferably along the rod-shaped body, is more or less constant. The cross section itself is largely arbitrary. Square cross sections are just as usable as hexagonal, elliptical, triangular or any other arbitrarily shaped geometric structures. Preferably, however, the cross section is designed so as to be round, so that the rod-shaped body is cylindrical, and the end faces need not be designed necessarily flat. Particularly advantageous in a round configuration is the rotational symmetry, as a result of which the rod-shaped body can also rotate without affecting the measurement values.

The parallel arrangement of the rod-shaped body to the direction of movement x means that a longitudinal axis of the rod-shaped body is aligned parallel to the direction of movement. In the case of a cylindrical body this axis is, for example, the cylinder axis. However, even in the case of rod-shaped bodies having a non-round cross section, such axes may be defined that can be arranged parallel to a direction of movement x. Even if the sensor arrangement of the invention is used preferably for translational movements of an object to be measured, a "parallel" arrangement of the rod-shaped body is possible even in the case of a movement along a circular path or a curve that is bent in some other way. In this case the rod-shaped body would track the changes in the direction of movement. If, for example, the direction of movement of the object to be measured is a circular path, then the rod-shaped body would also be bent in conformity with the circular path.

In order to ensure that magnetic fields do, in fact, emerge in an appropriate fashion on the longitudinal sides of the rod-shaped body, the geometric and/or magnetic properties (for example, relative permeability, remanence, saturation field strength) of the rod-shaped body should be adapted to the geometric and/or magnetic properties of the magnet or vice versa. The rod-shaped body should not be able to direct all of the magnetic flux, generated by the magnet. Usually this aspect is achieved by selecting the magnet according to its geometric and/or magnetic properties. Thus, said magnet could have the same or larger dimension than the rod-shaped body in the transverse direction. This feature ensures that the major portion of the magnetic flux that is already close to the magnet is not directed back again by way of the rod-shaped body and the air gap. This would, indeed, be the case if the diameter of the magnet were significantly smaller than that of the rod-shaped body. In this case the magnetic flux would already emerge at the end face facing the magnet and would close over the air gap to the other pole of the magnet, so that the magnetic fields would not emerge in a sufficient manner on the longitudinal side of the rod-shaped body. In order to avoid this drawback, it is advantageous for the magnet to have approximately the same or greater dimension than the rod-shaped body transversely to the direction of movement x.

In this context the term "air gap" denotes the medium that surrounds the rod-shaped body and/or the magnet and that is not made of a ferromagnetic material. The air gap could also comprise other liquid or gaseous media or non-ferromagnetic solids, i.e., in the broadest sense media that do not themselves affect or only slight affect the magnetic flux.

Furthermore, it is expedient to adjust the magnetic flux, generated by the magnet, to the permeability of the rod-shaped body. For a rod-shaped body having a very high relative permeability, a greater magnetic flux and, thus, a higher magnetic field strength is necessary. In this case one could use, for example, rare earth magnets. It has proven to be particularly advantageous to select, as a function of the desired measurement range of the arrangement a suitable combination of geometric and/or magnetic properties of the rod-shaped body and the magnet. That these requirements are easy to meet and how these requirements can be achieved will be obvious to those skilled in the art.

The rod-shaped body is connected to the magnet; that means that relative movements between the rod-shaped body and the magnet do not take place. In this way the rod-shaped body and the magnet move relative to the magnetic field sensor. This does not necessarily mean that the magnetic field sensor has to be fixed in position, even if this might be the case in many practical applications. It is also possible that the magnet and the rod-shaped body are stationary; and the magnetic field sensor is moved relative to the magnet and the rod-shaped body. In principle, it is also possible that neither the rod-shaped body with the magnet nor the magnetic field sensor is stationary.

At the same time the connection between the rod-shaped body and the magnet may be produced in any way. For example, a detachable connection would be conceivable. In the simplest design the magnet could be connected to the rod-shaped body merely by means of its own magnetic force. In the case of magnets with a high magnetic force, such as, for example, rare earth magnets, such a connection may suffice for simple applications. The advantage of this arrangement is that it can also be easily disconnected again. However, the magnet could also be fastened to the rod-shaped body with a screw joint, so that in this case, too, the rod-shaped body and the magnet are detachably connected to each other.

Since, however, such sensor arrangements will most likely remain unmodified over the entire service life (in most cases should even remain so), the magnet is preferably glued to the rod-shaped body. Suitable adhesives are well-known from the prior art. The said detachable and non-detachable connections are only a few preferred examples. However, they are not to be construed as limiting the mounting possibilities.

In order to achieve the greatest possible impact of the effect utilized according to the invention, the magnet in this case is disposed preferably on an end region of the rod-shaped body. "End region" means that on the end face of the rod-shaped body or on a longitudinal side the magnet is arranged less than 25% of the length of the rod-shaped body away from the end face of the rod-shaped body, in particular, is arranged in an especially preferred manner less than 10% of the length of the rod-shaped body away from the end face of the rod-shaped body.

The magnet is disposed in an especially preferred manner on the end face of the rod-shaped body, where in this case the north-south direction of the magnet is aligned preferably parallel to the direction of movement x. Since the rod-shaped body is arranged parallel to the direction of movement x, this means that the north-south direction is parallel to the rod-shaped body. In this case an arrangement at the end face is particularly advantageous for rotating rod-shaped bodies with an almost circular cross section. Then owing to the rotational symmetry of the arrangement the magnetic field distribution along the rod-shaped body is independent of the rotation, so that only the movement in the x direction is detected, and an interfering effect due to the rotation is avoided.

In a second preferred embodiment of the sensor arrangement the magnetic field sensor is connected to the rod-shaped body; this means that the relative movements between the rod-shaped body and the magnetic field sensor do not take place. As a result, the magnet moves relative to the magnetic field sensor and the rod-shaped body. This does not necessarily mean that the magnetic field sensor and the rod-shaped body have to be stationary, even if this may be the case in most practical application scenarios. It is also possible that the magnet is stationary, while the magnetic field sensor and the rod-shaped body can move relative thereto. It is also conceivable that neither the magnet nor the magnetic field sensor and the rod-shaped magnet are stationary.

In this case, too, the connection between the rod-shaped body and the magnetic field sensor can be implemented in a number of different ways. Bonding joints may be used just as well as a screw joint or any other detachable or non-detachable connection.

As already stated, the magnet can be disposed on a longitudinal side of the rod-shaped body. This, too, is to be understood as "in the magnet's zone of influence" in the context of the claimed teaching. In this arrangement the north-south direction of the magnet is aligned preferably perpendicular to the direction of movement x. In this way, as in the case of an end face-sided arrangement of the magnet, a magnetic field is coupled into the rod-shaped body and leaves the rod-shaped body again along the rod-shaped body. In this arrangement a plurality of magnets could also be arranged in the shape of a ring around the rod-shaped body. For example, four magnets could be distributed in each case at an angle of 90° around the circumference of a round, rod-shaped body or on the four side faces of a rod-shaped body having a square (or rectangular) cross section.

An arrangement on the longitudinal side of the rod-shaped body can be applied to the two aforementioned, preferred embodiments. In the case of a potential relative movement between the rod-shaped body and the magnet, the magnet (or even the magnets) is (are) spaced apart from the rod-shaped body. In the case of a connection of the magnet (or even the magnets) to the rod-shaped body, the magnetic field sensor is preferably less than 25% of the length of the rod-shaped body away from the end face of the rod-shaped body, even more preferably less than 10% of the length of the rod-shaped body away from the end face of the rod-shaped body.

As already stated, the geometry of the magnet may be selected as a function of the respective requirement. A rod magnet, which may be designed cylindrical or rectangular, is particularly easy to obtain. Instead of a rod-shaped magnet, a ring-shaped magnet may also be used. This ring-shaped magnet is also disposed preferably in the end region of the rod-shaped body. In this case the ring-shaped magnet is preferably designed in such a way that it can be placed around the rod-shaped body. In this context the inside diameter of the ring-shaped magnet is preferably slightly larger than the outside diameter of the rod-shaped body. When the magnet and the rod-shaped body are connected to each other, the result may be a shape-locking connection or even a force-locking connection between the ring-shaped magnet and the rod-shaped body. Preferably the north-south direction of the ring-shaped magnet is aligned perpendicular to the ring, thus, parallel to its axis of symmetry. In the case of the arrangement of the ring-shaped magnet around the rod-shaped body, the north-south direction is then parallel to the direction of movement x. In this embodiment, too, the magnet can couple a magnetic field into the rod-shaped body and, in so doing, can induce an emerging magnetic field at the surface of the rod-shaped magnet.

In a particularly advantageous embodiment an air gap exists between the ring-shaped magnet and the rod-shaped body. It has been found that a non-existent or very small air gap can cause the magnetic field lines to rejoin the magnet again at just a short distance from said magnet (magnetic short circuit), so that only a narrow measurement range is achieved. The term "air gap" denotes in turn a medium that is non-ferromagnetic. In this context even a bonding gap may be construed as an air gap. In this embodiment the north-south direction of the ring-shaped magnet is aligned parallel to the ring, thus, aligned parallel to the direction of movement. Owing to the air gap the magnetic field lines are directed into the rod-shaped body. In addition, the magnetic field lines could be directed into the body with suitable ferromagnetic conducting bodies. For example, a ring made of a ferromagnetic material could be mounted on the ring-shaped magnet, and the inside diameter of this ring is smaller than that of the ring-shaped magnet, with the result that the desired introduction of the magnetic fields into the rod-shaped body is achieved. Owing to the skillful arrangement of the magnet, the size of the air gap and with the use of ferromagnetic conducting bodies, the magnetic flux can be directed, depending on the type of requirement, in a suitable manner.

The use of a ring-shaped magnet is applicable to both a connection between the rod-shaped body and the magnet as well as a connection between the magnetic field sensor and the rod-shaped body, that is, in the case of a movable arrangement between the ring-shaped magnet and the rod-shaped body.

Instead of a ring-shaped magnet or a rod-shaped magnet, a disk-shaped magnet can also be used, to which the aforementioned explanations regarding ring-shaped magnets shall apply by analogy.

In principle, then the distance between a magnetic field sensor and a magnet is determined by the sensor arrangement of the invention, where in this case the magnetic field of the magnet is directed through the rod-shaped body. In order to be able to determine the position and/or the change in the position of an object to be measured, a movement of the object to be measured has to be coupled with a movement of the magnetic field sensor or a movement of the magnet. In the case of a coupling between the movements of the object to be measured and the magnet, this coupling is preferably achieved by connecting the magnet and the object to be measured to each other. This connection can be achieved by screwing the magnet to the object to be measured or by gluing the magnet to the object to be measured. The above explanations regarding the connection of the components shall apply mutatis mutandis. Another possibility of such a coupling is that the magnet is connected to the rod-shaped body, and the object to be measured is connected in turn to the rod-shaped body. In this way the movement of the object to be measured and the movement of the magnet are also coupled to each other. Thus, the object to be measured and the magnet are connected to each other more or less by means of the rod-shaped body.

A preferred embodiment of the coupling of the movement of the object to be measured and the movement of the magnetic field sensor consists of a connection of the object to be measured to the magnetic field sensor. This connection can be achieved by mounting the magnetic field sensor on the object to be measured, for example by means of a screw joint or a bonding joint. When the rod-shaped body is connected to the magnetic field sensor, this coupling of the movement between the magnetic field sensor and the object to be measured can also be achieved by connecting the object to be measured to the rod-shaped body and by connecting the rod-shaped body to the magnetic field sensor. This arrangement allows the object to be measured and the magnetic field sensor to be connected to each other by means of the rod-shaped body.

In the case of the aforementioned types of the coupling of the movements of the object to be measured and the magnet or the magnetic field sensor, the object to be measured does not necessarily have to be a separate element. Instead, it is also possible for the measured object to be formed by a part of the sensor arrangement. A preferred embodiment is that the object to be measured is formed by the rod-shaped body itself.

In a first preferred application scenario of the inventive sensor arrangement the rod-shaped body dips into a tube. In this case the magnetic field sensor is mounted on a wall of the tube. If the tube is made of a ferromagnetic material, then the magnetic field sensor can be mounted on the end face of the tube. If the tube is made of a non-ferromagnetic material, then the magnetic field sensor can also be mounted on the outside of the tube, since non-ferromagnetic media do not affect the magnetic flux, so that the magnetic fields also penetrate through the tube. In this case the tube may be stationary, so that the measured position or, more specifically, the change in the position is the depth of immersion of the rod-shaped body in the tube. This application example also includes if the rod-shaped body dips into a borehole or a recess in a body. In this case the magnetic field sensor would be disposed on the surface of the body outside the borehole, but in the vicinity of the borehole. In this case, too, the position or the change in the position that is determined by the sensor arrangement would be defined by the depth of immersion of the rod-shaped body in the body. In this context the movement occurs preferably in the longitudinal direction of the borehole or the recess.

In a second preferred application scenario the sensor arrangement is used to determine the position of a piston. In this case the rod-shaped body is formed by a piston rod having an end to which a piston, which moves in a cylinder, is fastened. The magnetic field sensor is mounted on an outer wall of the cylinder, preferably on the end face of the cylinder, i.e., on the side of the cylinder, on which the piston rod is guided into the cylinder. In this embodiment of the sensor arrangement the object to be measured is formed by the piston; and the position and/or the change in the position that is to be determined corresponds/correspond to the position and/or the change in the position of the piston inside the cylinder. Such sensor arrangements can be used, for example, in hydraulic cylinders.

In principle, a wide variety of magnetic field sensors can be used in conjunction with the sensor arrangement according to the invention. Conventional magnetic field sensors, such as Hall sensors, AMR or GMR sensors, have a characteristic curve, in which the sensitivity also decreases with a decrease in the magnetic field. Then the non-linear characteristic curve is intensified with these sensors by means of the non-linear drop in the magnetic field emerging from the rod-shaped body. This means that as the distance from the magnetic field sensor to the magnet increases, the sensitivity of the sensor arrangement decreases, so that the result is a non-linear characteristic curve.

Therefore, preferably a magnetic field sensor is used that uses non-linear effects of soft magnetic films. A preferred embodiment of such a sensor is disclosed in the world patent WO 2008/074317 A2, the contents of which are hereby incorporated by reference. This sensor comprises a coil having a zone of influence, in which a soft magnetic film is disposed. Soft magnetic films have the property that their relative permeability changes locally and reversibly as a function of the strength of a magnetic field acting on them. If such a soft magnetic film is disposed in the zone of influence of a coil, the inductance of the coil changes as a function of the strength of an external magnetic field. This change in the inductance can be detected by measurement and can be used to generate a measurement signal. Very often the coil is a part of an oscillating circuit, for example, a parallel resonant circuit having a resonance frequency that changes as a function of the external magnetic field. However, all other methods that are known from the field for measuring the inductance of a coil can be used. If a magnet is assigned to an object to be measured, then such a magnetic field sensor can be used to determine the field strength of the magnet at the location of the sensor; and this in turn can be used to determine the distance between the magnet and the magnetic field sensor.

In a preferred embodiment of such a sensor the coil is disposed in a first plane; and the soft magnetic film, in a second plane. This feature can be achieved, for example, in a particularly simple manner by forming the coil on a substrate, for example, a circuit board, in the form of a planar coil and by gluing the soft magnetic film to the coil. In this case an insulating layer may be provided between the coil and the soft magnetic film. In such a design of the magnetic field sensor the first plane is preferably arranged parallel to the second plane.

This preferred sensor may comprise one or more sensor coils. When using multiple coils and when designing with planar coils, they may be arranged side by side in one plane. However, it would also be conceivable to arrange the coils in multiple planes.

When using such a sensor having a soft magnetic film, the soft magnetic film is arranged preferably perpendicular to the direction of movement x. Since the magnetic fields of the magnet also leave the longitudinal sides of the rod-shaped body at the surface of the rod-shaped body, the vertical component of the emerging magnetic field can be measured by such an arrangement. As a result, a very high resolution can be achieved due to the high sensitivity of the sensor, since the magnetic field emerging at the position of the magnetic field sensor can be measured with a very high degree of accuracy. The use of such a sensor with a soft magnetic film permits one to obtain in a particularly advantageous manner an approximately linear output characteristic curve. The relative permeability µr of the soft magnetic film without an external magnetic field begins at a starting value and then increases with increasing field strength H up to a maximum value µr,0 at the field strength Ho. Thereafter, the permeability falls non-linearly as the field strength increases. When the soft magnetic film is used in a magnetic field sensor, the working range is placed into this falling edge of the characteristic curve.

On the other hand, the field strength of a magnet also drops non-linearly as the distance from the magnet increases. Magnetic fields are directed to some extent by ferromagnetic bodies. The inventive arrangement of the magnet and the rod-shaped body allows the magnetic fields to be guided along the body. In this case the portion of the magnet's magnetic field leaving the rod-shaped body has a non-linear descent along the rod-shaped body. The field strength at the surface of a longitudinal side of the rod-shaped body is the highest in the vicinity of the magnet and decreases non-linearly towards the end of the rod-shaped body. The perpendicularly emerging component of the magnetic field $H^\perp$ is measured in essence by arranging the soft magnetic film of the magnetic field sensor perpendicular to the direction of movement and near the surface of the rod-shaped body. The non-linear drop in the characteristic curves often complies with an exponential function. However, other monotonically decreasing, non-linear characteristic curves are also possible. The combination of the two non-linear dependencies results in an almost linear characteristic curve as a function of the position of the magnet relative to the magnetic field sensor. This feature provides a measurement signal that has a linear relationship with the position without sophisticated linearization.

In principle, the magnet in the inventive sensor arrangement can be implemented in a number of different ways. It would be possible to use an electromagnet, through which a direct current flows. In this way the magnetic field can be adjusted to different external conditions, for example, special installation situations. Even a pulsed operation of the electromagnet would be conceivable in order to reduce the current consumption. It would also be conceivable that the electromagnet is operated with an alternating current; and, in so doing, an alternating field is coupled into the rod-shaped body. In this case the measurement signal could be synchronized with the current by means of the solenoid in order to be able to evaluate the alternating amplitude (for example, by means of a synchronous modulation or lock-in technique). In this way it is possible to consider installation situations with high electromagnetic interference.

However, according to a particularly preferred embodiment, the magnet is formed by a permanent magnet. This embodiment has the advantage that the power consumption is significantly less than that of an electromagnet. At the same time the magnet does not have to be supplied with power, an aspect that would not always be possible, for example, with a movably arranged magnet.

BRIEF DESCRIPTION OF THE FIGURES

At this point there are a variety of ways to configure and further develop the teaching of the present invention in an advantageous manner. For this purpose reference is made, on the one hand, to the claims subordinate to claim 1 and, on the other hand, to the following explanation of preferred exemplary embodiments of the invention with reference to the drawings. In conjunction with the explanation of the preferred exemplary embodiments of the invention with reference to the drawings, preferred embodiments and further developments of the teaching are also explained in general. In the drawings:

DETAILED DESCRIPTION OF VARIOUS EMBODIMENTS

Figure 1:
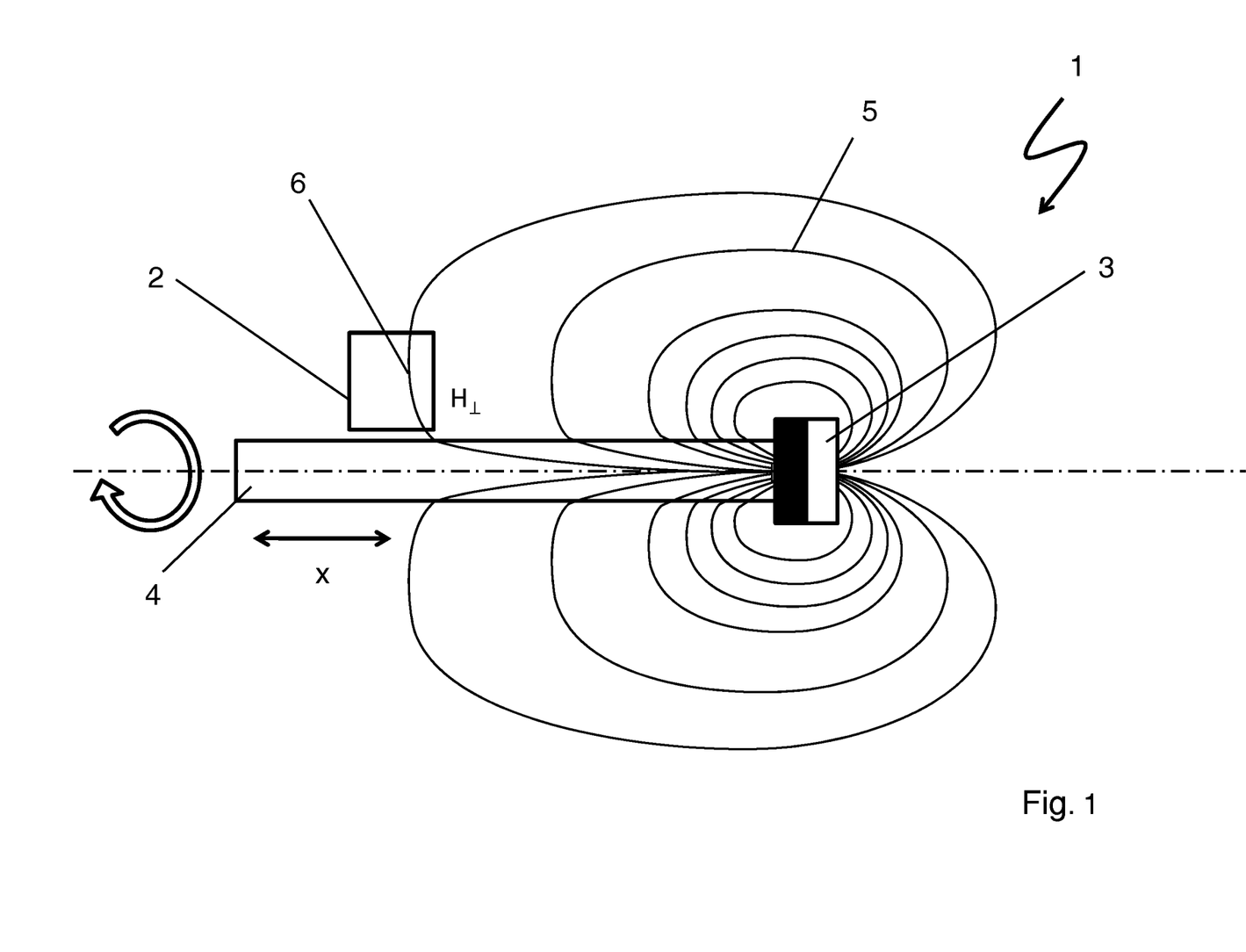
FIG. 1 shows in schematic form a representation of the essential elements of an inventive sensor arrangement for purposes of explaining the operating principle, where in this case the magnet is connected to the rod-shaped body.

FIG. 1 shows in schematic form a representation of an inventive sensor arrangement 1, by means of which the operating principle of the sensor arrangement shall be explained in greater detail. The sensor arrangement 1 comprises a magnetic field sensor 2, a magnet 3 and a rod-shaped body 4. The magnet 3 is mounted on the end face of the rod-shaped body 4, with the magnet 3 being glued to the rod-shaped body 4. The magnetic field sensor 2 is disposed on a longitudinal side of the rod-shaped body 4. Although the magnetic field sensor 2 is mounted very close to the surface of the rod-shaped body, it is still disposed at a certain distance therefrom. The magnet 3 and the rod-shaped body 4 can move together relative to the magnetic field sensor 2 in a direction of movement x, which is indicated by a double arrow in FIG. 1. As can be seen in FIG. 1, the rod-shaped body is arranged parallel to this direction of movement x. In the illustrated example of the sensor arrangement the rod-shaped body 4 is formed, together with the magnet 3, rotationally symmetrical, and can be rotated. Even if this is a preferred embodiment, it is not necessary that these properties be present.

The rod-shaped body 4 is made of a ferromagnetic material. The magnet 3 generates a magnetic field 5, which is guided along the rod-shaped body 4 and leaves again the rod-shaped body 4 on its longitudinal side. At the same time the field strength of the portion of the magnetic field is a function of the distance from the magnet 3, which is indicated in FIG. 1 by a decreasing density of magnetic field lines. The magnetic field sensor 2 measures precisely this portion of the magnetic field. Since the field strength decreases as a function of the distance from the magnet 3, the magnetic field sensor 2 can generate a measurement signal that is representative of the distance between the magnetic field sensor 2 and the magnet 3. This signal can be used to determine the position of a measured object (not shown), which is mounted, for example, on the left end face (in FIG. 1) of the rod-shaped body.

The magnetic field sensor 2 comprises a soft magnetic film having magnetic properties (in particular, permeability), which are influenced by the magnetic field emerging from the rod-shaped body 4. The change in the magnetic properties along the film is detected by means of one (or more) of the coils of the sensor and is outputted by the sensor as a measurement signal. The magnetic field sensor 2 is mounted in such a way that essentially the component 6 of the magnetic field 5 that is perpendicular to the direction of movement (or, more specifically, the direction of the rod-shaped body) is detected. This feature is achieved in that the soft magnetic film of the magnetic field sensor 2 is oriented approximately perpendicular to the direction of movement x.

In this case the rod-shaped body has the effect that by guiding the magnetic field along the rod-shaped body it is possible to achieve a far greater range of measurement (factor 4 to 5) than with the magnetic field sensor known from the prior art. Another important advantage of this arrangement is that the combination of magnet and magnetic field sensor with a soft magnetic film achieves a linearization of the characteristic curve.

Figure 2:
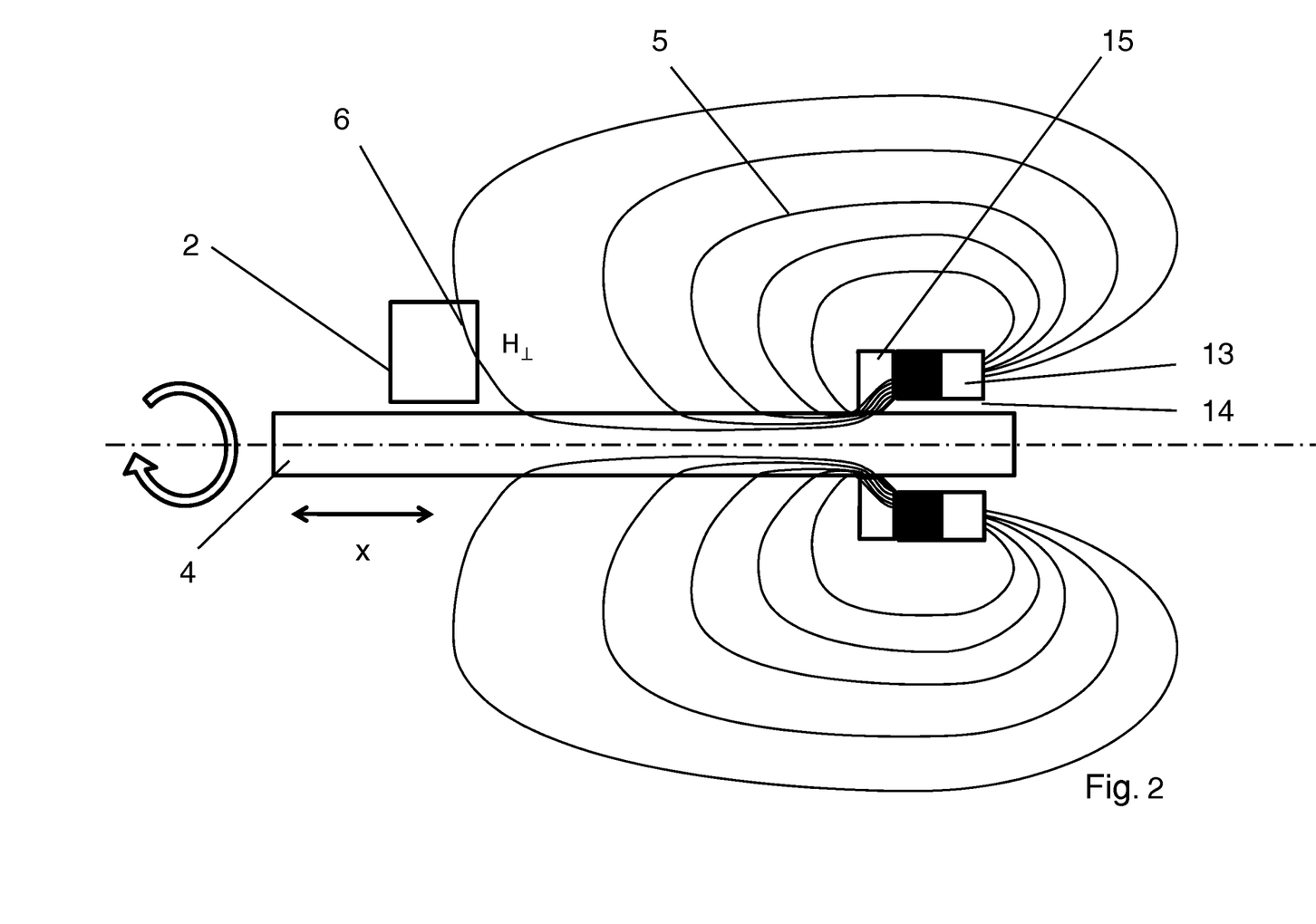
FIG. 2 shows in schematic form a representation of an inventive sensor arrangement similar to the one shown in FIG. 1, where in this case the magnet is formed by a ring-shaped magnet that has an air gap to the rod-shaped body.

FIG. 2 shows a similar representation in schematic form, where in this case a ring-shaped magnet 13 is used. In addition to the ring-shaped magnet 13, the sensor arrangement includes again a magnetic field sensor 2 and a rod-shaped body 4. An air gap 14 is formed between the ring-shaped magnet 13 and the rod-shaped body 4. The air gap denotes a relatively arbitrary medium that is non-ferromagnetic. The medium may be formed not only by air, but also by a variety of gaseous or solid substances. In the exemplary embodiment according to FIG. 2, the air gap 14 is a bonding gap. A ring-shaped conducting body 15, made of a ferromagnetic material, is disposed on an end face of the ring-shaped magnet. The north-south direction of the ring-shaped magnet 13 is aligned parallel to the ring, i.e., aligned parallel to the direction of movement x. Through the air gap 14 the magnetic field lines are directed by way of the conducting body 15 into the rod-shaped body 4. The inside diameter of the conducting body 15 is smaller than that of the magnet 13, i.e., the inner surface of the conducting body 15 is closer to the rod-shaped body 4 than the inner surface of the magnet 13. This arrangement achieves the desired introduction of the magnetic fields into the rod-shaped body. Owing to the skillful arrangement of the magnet 13, the size of the air gap 14 and with the use of ferromagnetic conducting bodies 15, the magnetic flux can be directed, depending on the type of requirement, in a suitable manner. The perpendicular component $H^\perp$ of the magnetic field 6 is measured by the magnetic field sensor 2.

Figure 3:
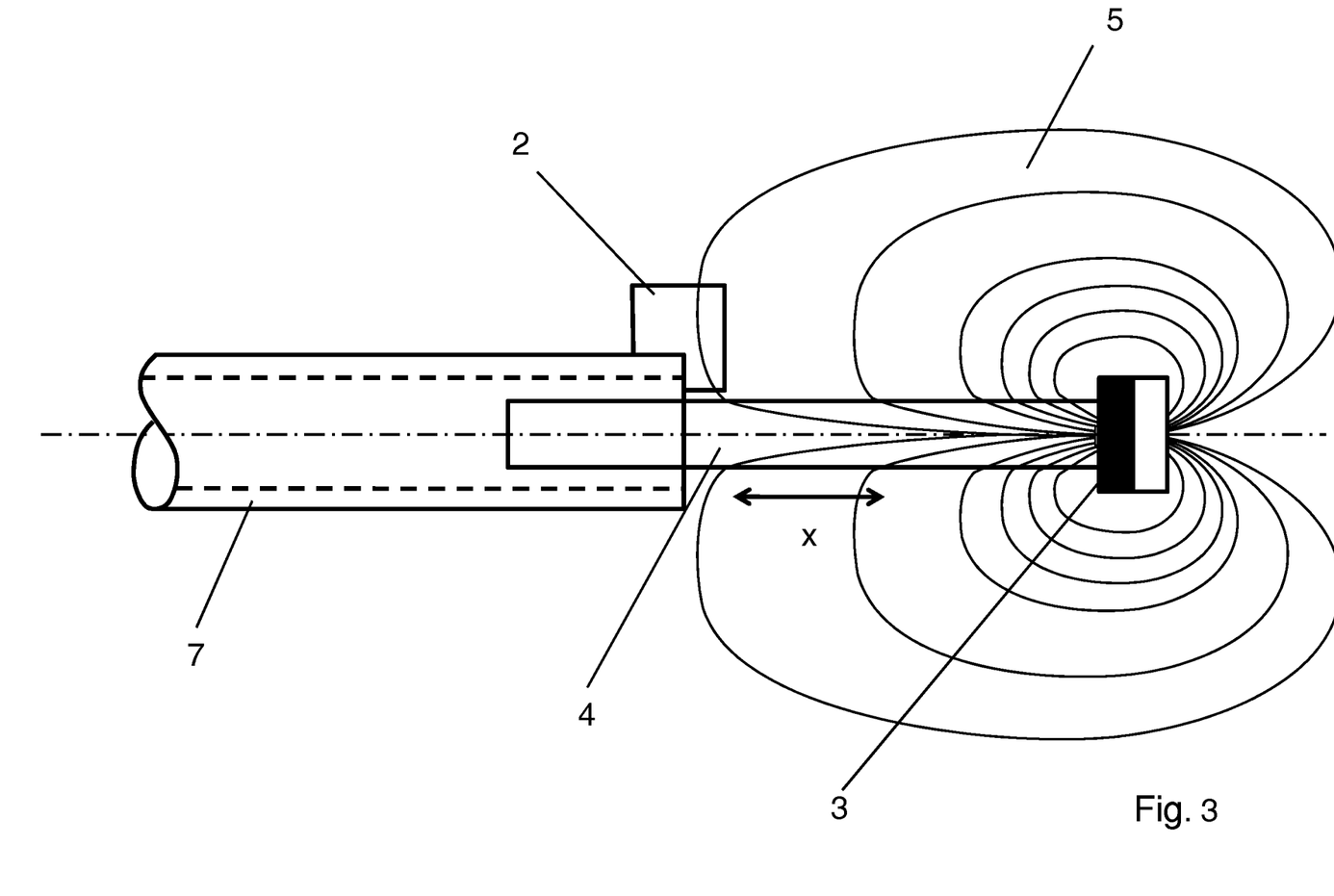
FIG. 3 shows a first exemplary embodiment of an inventive sensor arrangement with a rod-shaped body that dips into a tube.

The basic principle, described above, is used in a first exemplary embodiment of an inventive sensor arrangement in FIG. 3. A magnet 3 is mounted on a rod-shaped body 4. The rod-shaped body 4 dips into a tube 7, where in this case the axis of the tube 7 coincides with the axis of the rod-shaped body 4. A magnetic field sensor 2 is mounted on a wall of the tube 7, into which the rod-shaped body 4 dips. The measurement signal of the magnetic field sensor can be used to determine the position of the magnet in the form of the depth of immersion of the rod-shaped body. In this case the rod-shaped body itself represents the object to be measured; and the objective is to measure its depth of immersion in the tube.

Figure 4:
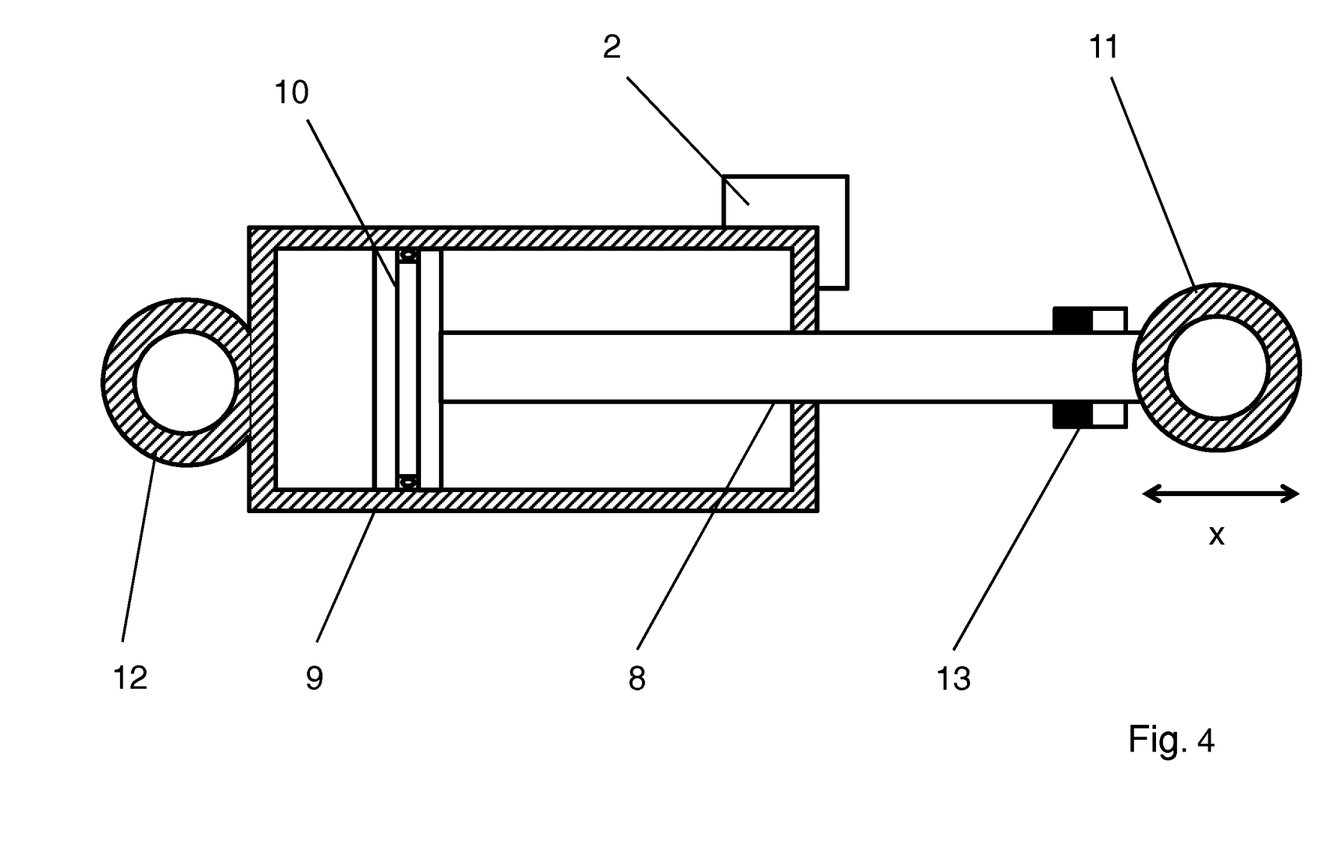
FIG. 4 shows a second exemplary embodiment of an inventive sensor arrangement that is designed as a piston position sensor.

FIG. 4 shows a second exemplary embodiment of a sensor arrangement according to the invention, where in this example the sensor arrangement is designed as a piston position sensor. The rod-shaped body is formed by a piston rod 8 that passes through an opening into a hydraulic cylinder 9. On the one end face of the piston rod 8 (in FIG. 4: on the left) a piston 10 is mounted; and on the other end face (in FIG. 4: on the right) an eyelet 11 is mounted. An additional eyelet 12 is mounted on the side of the hydraulic cylinder 9 that faces away from the opening for the piston rod. The machine elements, which are to be moved by means of the hydraulic cylinder, can be connected by means of the two eyelets 11 and 12.

In the end region of the piston rod 8 a ring-shaped magnet 13 is disposed on the side of the piston rod that faces away from the piston. In this case the inside diameter of the ring-shaped magnet 13 is slightly larger than the outside diameter of the piston rod 8, as a result of which an air gap is produced, and the magnet 13 may be securely connected to the piston rod 8 with an adhesive. A magnetic field sensor 2 is securely mounted on the hydraulic cylinder 9, with the result that the distance between the magnetic field sensor 2 and the magnet 13 can be determined. Since the movement of the piston 10—in this case the object to be measured—is coupled to the movement of the magnet 13 by means of the piston rod 8, the magnet 13 moves with the piston rod 8 and the piston 10, so that the position of the piston 10 in the x direction can be determined from the distance between the magnet 13 and the magnetic field sensor 2. This example can be applied to a plurality of actuators, for example, also pneumatic cylinders, or electric actuators.

Figure 5:
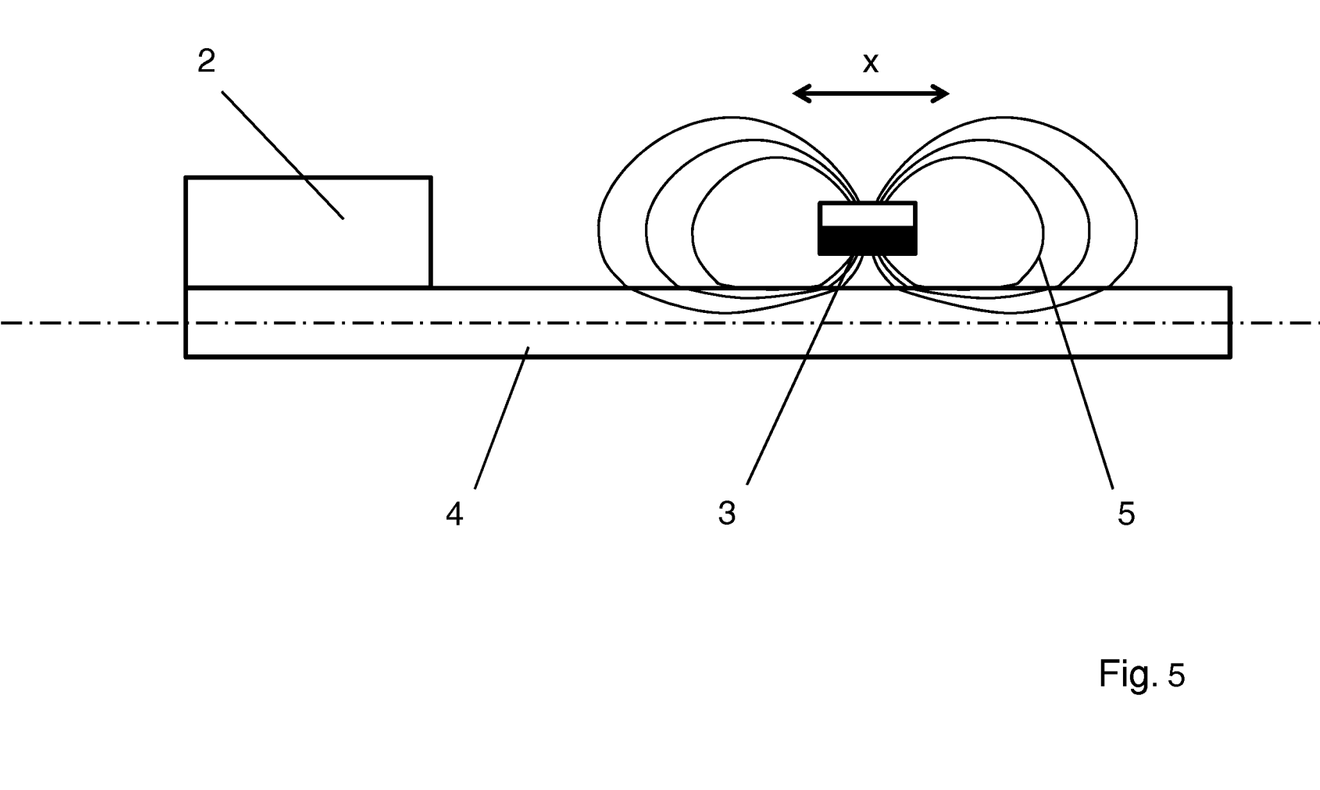
FIG. 5 shows in schematic form a representation of an inventive sensor arrangement, in which the magnetic field sensor is connected to the rod-shaped body.

In the preceding figures the magnet is connected to the rod-shaped body. FIG. 5 shows an additional exemplary embodiment, in which the magnetic field sensor 2 is connected to the rod-shaped body 4, and the magnet can move relative to the magnetic field sensor 2 and the rod-shaped body 4. The magnet 3 is connected to an object that is to be measured (not shown). The rod-shaped body 4 is disposed in the zone of influence of the magnet 2, so that the magnetic field of the magnet 2 penetrates at least partially into the rod-shaped body 4. The rod-shaped body 4 in turn guides the magnetic field to the magnetic field sensor 2, which is securely connected to said rod-shaped body. In this case the measuring principle is the same as in the figures explained above.

This example can be used in many ways, for example, in a movable part of a machine that moves relative to the machine frame. A magnet 3 is mounted on the movable part of the machine, while the magnetic field sensor is fixed to the machine frame. Then the relative movement of the two parts with respect to each other is measured, and this measurement is used to determine the change in the position of the movable part relative to the machine frame. In this case there are a wide range of applications, in which two objects move relative to each other; and their relative position is to be measured.

Figure 6:
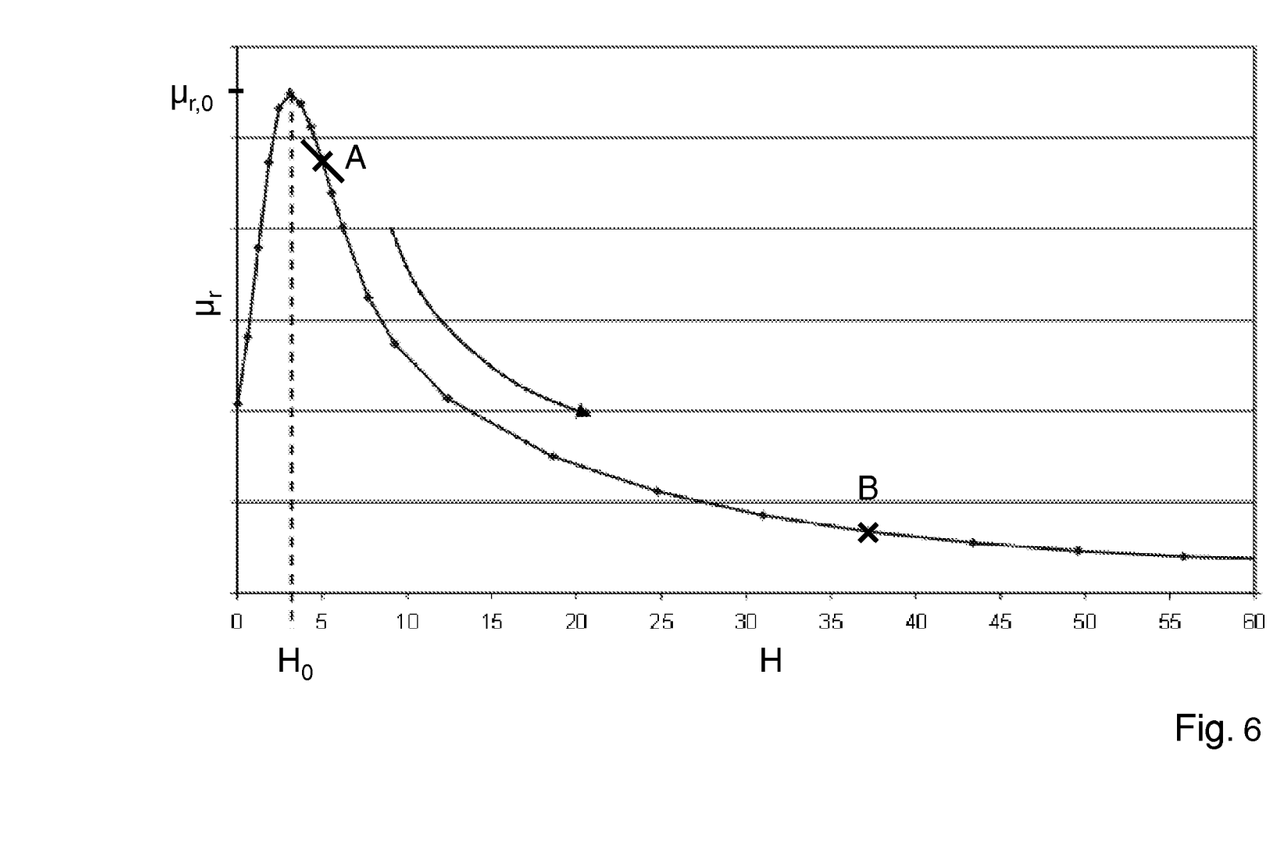
FIG. 6 shows a graph for purposes of illustrating the relationship between the magnetic field strength and the permeability of a soft magnetic film.

The characteristic curve of such a sensor arrangement 1 shall be considered in more detail below with reference to FIGS. 6 to 9. In this case a magnetic field sensor with a soft magnetic film is used. The dependence of the relative permeability μr of the soft magnetic film on the field strength H, acting on said film, is shown in FIG. 6. Without an external magnetic field the relative permeability has a starting value that increases up to a field strength H0 to a value Hr,0. Thereafter, the permeability drops non-linearly with increasing field strength. When the soft magnetic film is used in a magnetic field sensor, the working range is placed in the falling edge of the characteristic curve. Conceivable would be the range between the points A and B of the characteristic curve.

Figure 7:
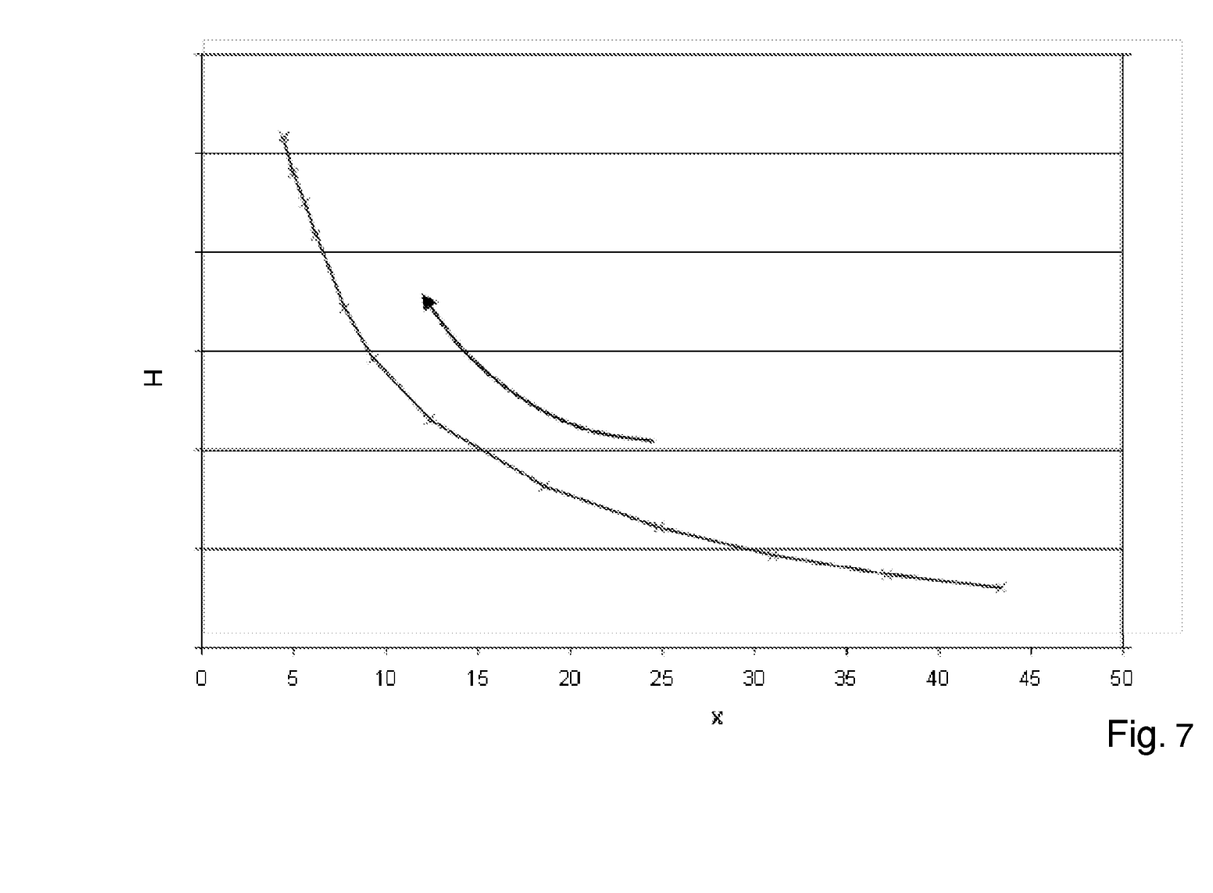
FIG. 7 shows a graph illustrating the magnetic field strength, which emerges on a longitudinal side of the rod-shaped body, as a function of the distance from the magnet.

FIG. 7 shows a graph illustrating the dependence of the field strength H along the rod-shaped body 2 near its surface, where in this case the rod-shaped body 2 is securely connected either to the magnet (according to FIG. 1 or 2), or the rod-shaped body is securely connected to the magnetic field sensor (according to FIG. 5). The perpendicularly emerging component $H^\perp$ of the magnetic field is measured in essence by arranging the soft magnetic film of the magnetic field sensor perpendicular to the direction of movement and near the surface of the rod-shaped body (for example, up to a few millimeters away from the surface). It can be seen that with increasing distance from the magnet, the field strength H, which can be detected at the surface of the rod-shaped body, decreases non-linearly.

Figure 8:
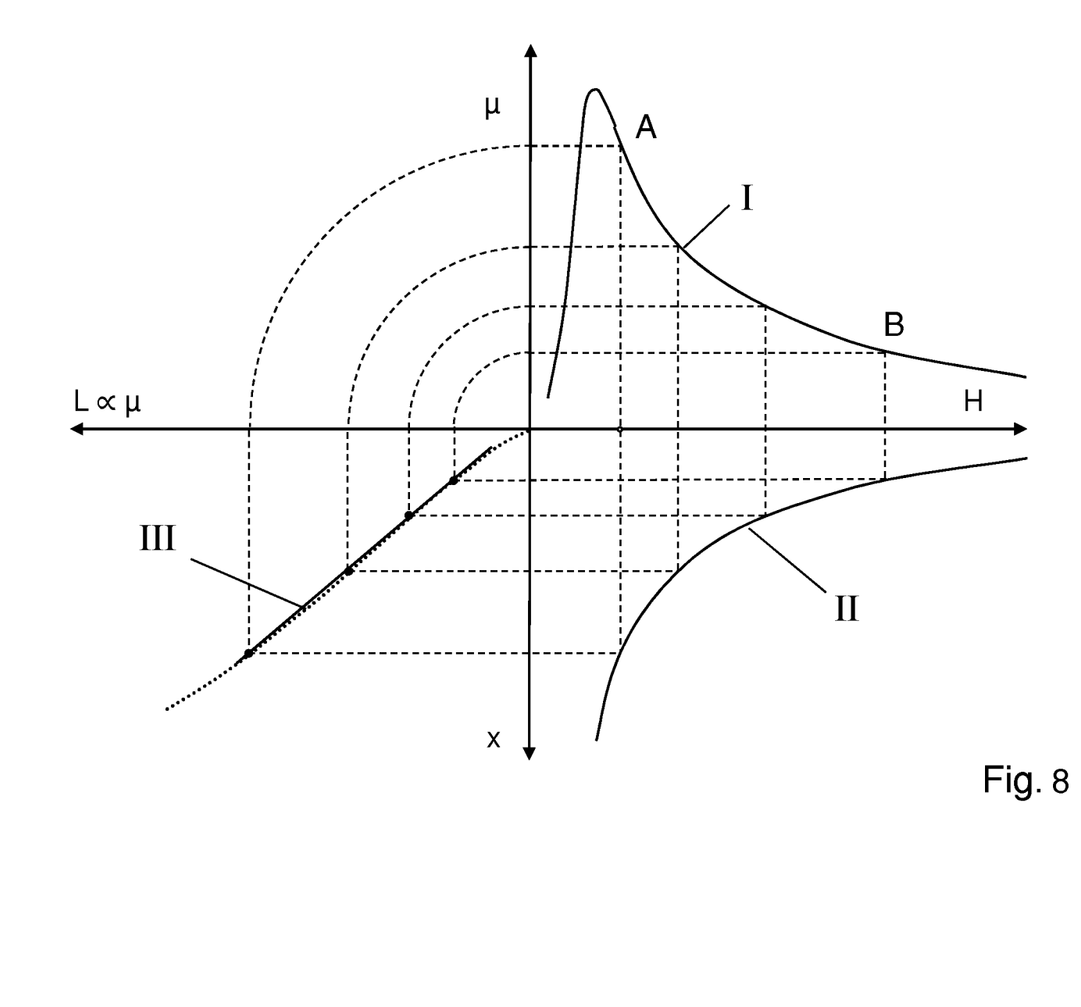
FIG. 8 shows a combined graph for deriving the characteristic curve of a sensor arrangement according to the invention.

In FIG. 8 these two relationships are combined; and this combination is used to derive the characteristic curve of the sensor. In section I of the graph (top right field) the dependence of the relative permeability μr on the field strength H is shown. The falling portion of the characteristic curve between the points A and B is used. Section II (bottom right field) shows the dependence of the field strength (vertical component) on the position x. The position x denotes the distance of the magnet, mounted on the rod-shaped body, from the magnetic field sensor. Finally section III (bottom left field) shows the graphical representation of the characteristic curve, in particular, the inductance of the measuring coil of the magnetic field sensor (which in turn is proportional to the permeability). The characteristic curve is almost linear as a function of the position x. The result is that a measurement signal is provided that has a linear relationship with the position x without sophisticated linearization.

Figure 9:
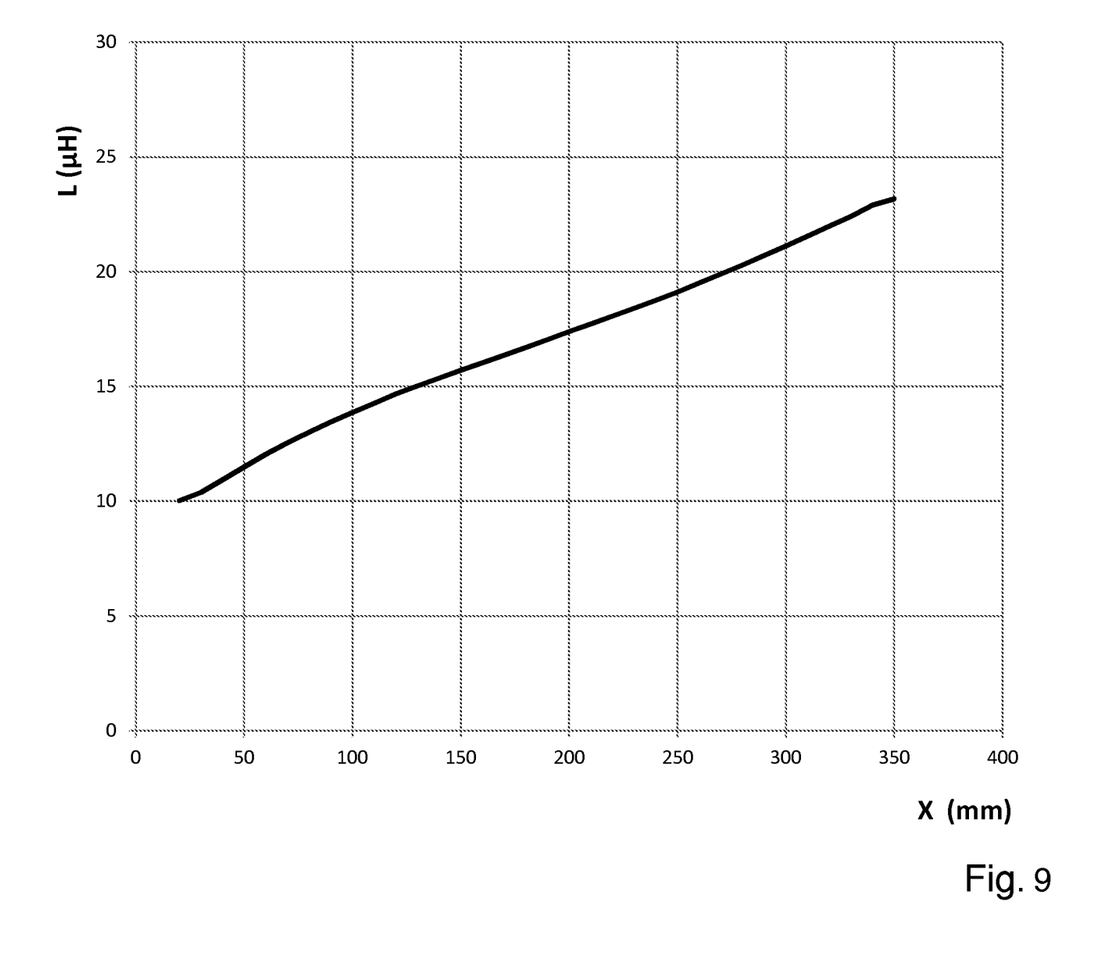
FIG. 9 shows a graph of a measured characteristic curve of an inventive sensor arrangement that shows the relationship between the inductance of the sensor coil and the position of an object to be measured.

FIG. 9 shows a measured characteristic curve of the inductance L of a sensor coil as a function of the position x for a specific exemplary embodiment according to FIG. 1. The rod-shaped body is formed by a piston rod having a diameter D=20 mm and made of ferromagnetic steel 20MnV6. The ring-shaped magnet, which is made of NeFe13, has an outside diameter Da=20 mm, an inside diameter Di=14 mm and a height of 10 mm and which is polarized along the central axis (i.e., the north-south direction of the magnet is parallel to the piston rod), is placed on the end face of the piston rod. The measuring element of the magnetic field sensor consists of a soft magnetic film, which is made of Vitrovac and has a planar coil with dimensions of 10×15 mm and which is glued directly onto the film. The inductance of the coil was measured with a measuring bridge, where in this case the piston rod was moved with the magnet over an area of 325 mm in the x direction. It can be seen very clearly in FIG. 9 that the approximately linear relationship between the inductance and the position could be documented by measurement. Thus, a measurement signal is obtained that depends linearly on the position of an object to be measured.

With respect to other advantageous embodiments of the inventive sensor arrangement reference is made to the general part of the description and to the accompanying claims for the sake of avoiding repetition.

Finally, it is explicitly to be noted that the above described exemplary embodiments of the inventive sensor arrangement are intended only to explain the claimed teaching, but do not limit said teaching to said exemplary embodiments.

LIST OF REFERENCE NUMERALS 1 sensor arrangement
2 magnetic field sensor
3 magnet
4 rod-shaped body
5 field lines
6 vertical component of the magnetic field
7 tube
8 piston rod
9 hydraulic cylinder
10 piston
11 eyelet
12 eyelet
13 ring-shaped magnet
14 air gap
15 conducting body

The invention claimed is:

1. Sensor arrangement for determining the position and/or the change in the position of an object to be measured, the sensor arrangement comprising:
   a magnet; and
   a magnetic field sensor, the magnet and the magnetic field sensor both being movable relative to each other in a direction of movement (x),
   wherein:
   the magnet generates a magnetic field,
   the movements of the magnet and the object to be measured or the movements of the magnetic field sensor and the object to be measured are coupled,
   a rod-shaped body made of a ferromagnetic material is provided, find said rod-shaped body having a larger dimension in the longitudinal direction than in the transverse direction,
   a relative movement between the rod-shaped body and the magnet does not take place,
   the rod-shaped body directs the magnetic field of the magnet at least partially in the direction of the magnetic field sensor,
   the rod-shaped body is arranged parallel to the direction of movement (x), and
   the magnetic field sensor is disposed on a longitudinal side of the rod-shaped body and is configured to generate a measurement signal from a portion of the magnetic field that emerges from the rod-shaped body at the magnetic field sensor, as a result of which at least one of the position or the change in the position of the object to be measured can be determined from the measurement signal.

2. Sensor arrangement, as claimed in claim 1, wherein magnet and rod-shaped body are adapted to each other in such a way that the magnet impresses a non-linear magnetic field distribution along the body.

3. Sensor arrangement, as claimed in claim 1, wherein the magnet is connected to the rod-shaped body so that the magnet and rod-shaped body can be moved together relative to the magnetic field sensor.

4. Sensor arrangement, as claimed in claim 3, wherein the magnet is mounted on an end face of the rod-shaped body and that the north-south direction of the magnet is aligned parallel to the direction of movement (x).

5. Sensor arrangement, as claimed in claim 1, wherein the magnetic field sensor is connected to the rod-shaped body so that the magnet can be moved relative to the magnetic field sensor and the rod-shaped body.

6. Sensor arrangement, as claimed in claim 3, wherein the magnet is disposed on a longitudinal side of the rod-shaped body and that the north-south direction of the magnet is aligned perpendicular to the direction of movement (x).

7. Sensor arrangement, as claimed in claim 1, wherein the magnet is designed as a ring-shaped magnet, wherein the magnet is arranged around the rod-shaped body and that the north-south direction of the magnet is aligned parallel to the direction of movement (x).

8. Sensor arrangement, as claimed in claim 1, wherein an air gap is formed between the rod-shaped body and the magnet.

9. Sensor arrangement, as claimed in claim 1, wherein the coupling of the movements of the object to be measured and of the magnet is achieved in that the object to be measured and the magnet are connected to each other, optionally by means of the rod-shaped body.

10. Sensor arrangement, as claimed in claim 1, wherein the coupling of the movements of the object to be measured and of the magnetic field sensor is achieved in that the object to be measured and the magnetic field sensor are connected to each other, optionally by means of the rod-shaped body.

11. Sensor arrangement, as claimed in claim 1, wherein the rod-shaped body dips into a tube and that the magnetic field sensor is mounted on a wall of the tube.

12. Sensor arrangement, as claimed in claim 1, wherein the rod-shaped body is formed by a piston rod, which is connected to a piston disposed in a cylinder; and
   the magnetic field sensor is mounted on a wall of the cylinder.

13. Sensor arrangement, as claimed in claim 1, comprising a non-linear characteristic curve of the magnetic field sensor.

14. Sensor arrangement, as claimed in claim 2, wherein the non-linear magnetic field distribution along the rod-shaped body and the non-linear characteristic curve of the magnetic field sensor are adapted to each other in such a way that a measurement signal of the magnetic field sensor approximates a linear characteristic curve for at least one of the position or the change in the position to be determined.

15. Sensor arrangement, as claimed in claim 1, wherein the magnetic field sensor comprises a coil and a soft magnetic film, disposed in the zone of influence of the coil, wherein the permeability of the soft magnetic film undergoes a change under the influence of the magnetic field generated by the magnet, wherein the change in permeability results in a change in the inductance of the coil, and wherein a measurement signal can be generated from the change in the inductance.

16. Sensor arrangement, as claimed in claim 15, wherein the coil is disposed in a first plane; and the soft magnetic film, in a second plane, with the first plane being preferably parallel to the second plane.

17. Sensor arrangement, as claimed in claim 15, wherein the soft magnetic film is arranged perpendicular to the direction of movement (x).

18. Sensor arrangement, as claimed in claim 1, wherein the magnet is formed by an electromagnet or a permanent magnet.

19. Method for determining at least one of the position or the change in the position of an object to be measured using a sensor arrangement, as claimed in claim 1, said method comprising the steps of:
   impressing a magnetic field in a rod-shaped body, made of a ferromagnetic material, by means of a magnet, wherein the magnetic field is directed at least partially in the direction of a magnetic field sensor by means of the rod-shaped body, and wherein the rod-shaped body is arranged parallel to a direction of movement (x), in which at least one of the magnetic field sensor or the magnet can be moved relative to each other;

detecting a magnetic field, emerging on a longitudinal side of the rod-shaped body, by means of the magnetic field sensor for generating a measurement signal; and determining at least one of the position or the change in the position of the measured object from the measurement signal;

wherein:

the body has a significantly larger dimension in the longitudinal direction than in the transverse direction; and a relative movement between the body and the magnet does not take place.

* * * * *